(12) United States Patent
Xi et al.

(10) Patent No.: US 10,678,384 B2
(45) Date of Patent: Jun. 9, 2020

(54) VARIABLE ARRAY DUAL-FUNCTION TOUCH SENSOR, CONTROL DETECTION SYSTEM, TOUCH MODULE AND TOUCH DISPLAY DEVICE

(71) Applicant: GUANGDONG ZONGHUA TOUCH CONTROL TECHNOLOGY CO. LTD., Dongguan, Guangdong (CN)

(72) Inventors: Bangzi Xi, Dongguan (CN); Dezhong Zhu, Dongguan (CN)

(73) Assignee: GUANGDONG ZONGHUA TOUCH CONTROL TECHNOLOGY CO. LTD., Dongguan (CN)

(*) Notice: Subject to any disclaimer, the term of this patent is extended or adjusted under 35 U.S.C. 154(b) by 75 days.

(21) Appl. No.: 15/566,166

(22) PCT Filed: Nov. 28, 2016

(86) PCT No.: PCT/CN2016/107426
§ 371 (c)(1),
(2) Date: Oct. 12, 2017

(87) PCT Pub. No.: WO2017/143819
PCT Pub. Date: Aug. 31, 2017

(65) Prior Publication Data
US 2018/0113528 A1    Apr. 26, 2018

(30) Foreign Application Priority Data
Feb. 23, 2016    (CN) .......................... 2016 1 0100035

(51) Int. Cl.
*G06F 3/044* (2006.01)
*G06F 3/041* (2006.01)
(Continued)

(52) U.S. Cl.
CPC .............. *G06F 3/044* (2013.01); *G06F 3/046* (2013.01); *G06F 3/047* (2013.01); *G06F 3/0416* (2013.01);
(Continued)

(58) Field of Classification Search
CPC .......... G06F 3/044; G06F 3/046; G06F 3/047; G06F 3/0416; G06F 2203/04112; G06F 2203/04106; G06F 2203/04103
See application file for complete search history.

(56) References Cited

U.S. PATENT DOCUMENTS 9,262,034 B2 *   2/2016   Yao ........................ G06F 3/0383
9,535,558 B2 *   1/2017   Lu ......................... G06F 3/0412
(Continued)

FOREIGN PATENT DOCUMENTS

CN     102163112 A     8/2011
CN     102819374 A    12/2012
(Continued)

OTHER PUBLICATIONS

Mar. 7, 2017 International Search Report issued in International Patent Application No. PCT/CN2016/107426.

*Primary Examiner* — Benyam Ketema

(57) ABSTRACT

A variable array dual-function touch sensor, dual-function touch control detection system, dual-function touch module and display device with a dual-function touch module. The sensor includes a variable array dual-function touch sensing antenna array, including first and second-direction antenna array sets. The first set includes more than two parallel first-direction transparent electric conductors; the second set includes more than two parallel second-direction transparent electric conductors. The conductors are formed by a continuous metal net composed of very fine metal wires, tin doped indium oxide, or nanometer silver filaments. The system includes a touch main control board, first and second (Continued)

array switches, the board including an electromagnetic-capacitive switching circuit, capacitive touch signal scanning detection circuit, electromagnetic touch signal scanning detection circuit and processor. The dual-module includes a variable array dual-function touch sensor and dual-function touch control detection system. The display device includes a dual-function touch module and display screen module.

7 Claims, 17 Drawing Sheets

(51) Int. Cl.
*G06F 3/047* (2006.01)
*G06F 3/046* (2006.01)

(52) U.S. Cl.
CPC .............. *G06F 2203/04103* (2013.01); *G06F 2203/04106* (2013.01); *G06F 2203/04112* (2013.01)

(56) References Cited

U.S. PATENT DOCUMENTS

| | | | | |
|---|---|---|---|---|
| 9,612,702 B2* | 4/2017 | Jiang | ...................... | G06F 3/044 |
| 9,639,216 B2* | 5/2017 | Lu | .......................... | G06F 3/0416 |
| 9,733,781 B2* | 8/2017 | Lu | .......................... | G06F 3/046 |
| 9,846,517 B2* | 12/2017 | Li | .......................... | G06F 3/044 |
| 2012/0313863 A1* | 12/2012 | Hsu | ........................ | G06F 3/0412 |
| | | | | 345/173 |
| 2013/0009905 A1* | 1/2013 | Castillo | ................... | G06F 3/044 |
| | | | | 345/174 |
| 2014/0043284 A1* | 2/2014 | Park | ........................ | G06F 3/044 |
| | | | | 345/174 |
| 2014/0071083 A1* | 3/2014 | Yoo | ......................... | G06F 3/046 |
| | | | | 345/174 |
| 2015/0049034 A1* | 2/2015 | Post | ........................ | G06F 3/041 |
| | | | | 345/173 |
| 2015/0261346 A1* | 9/2015 | Du | ......................... | G06F 3/0416 |
| | | | | 345/174 |

FOREIGN PATENT DOCUMENTS

| | | | |
|---|---|---|---|
| CN | 103092446 | * | 5/2013 |
| CN | 103092446 A | | 5/2013 |
| CN | 102163112 | * | 12/2014 |
| CN | 105487736 A | | 4/2016 |
| CN | 105630248 A | | 6/2016 |
| CN | 205809836 U | | 12/2016 |

* cited by examiner

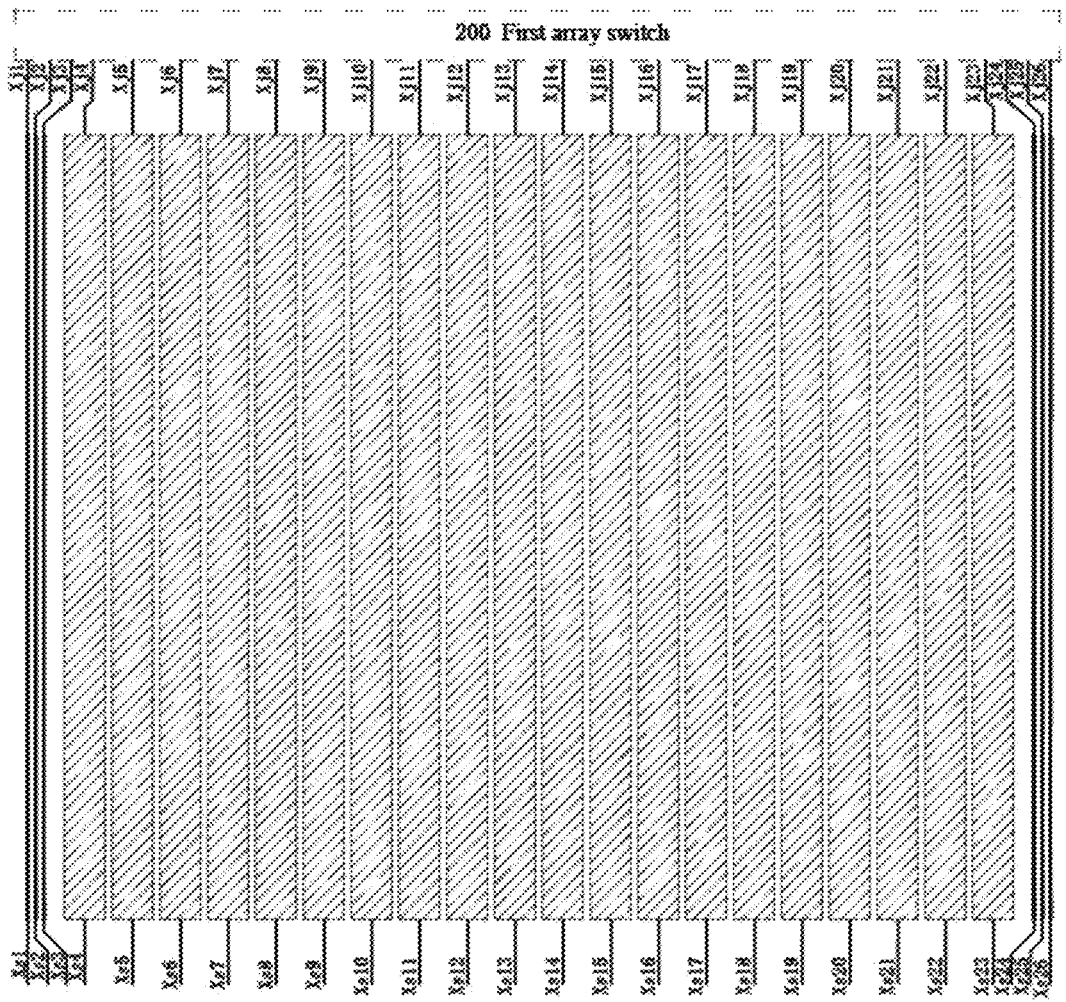
Fig. 6.1

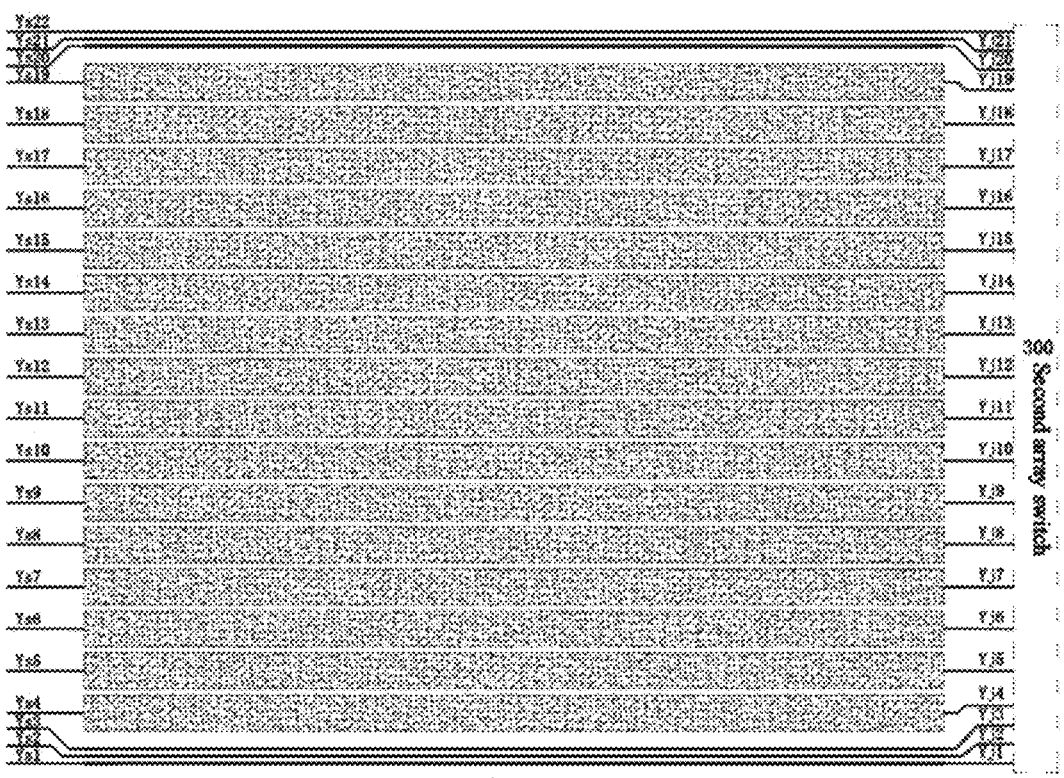
Fig. 6.2

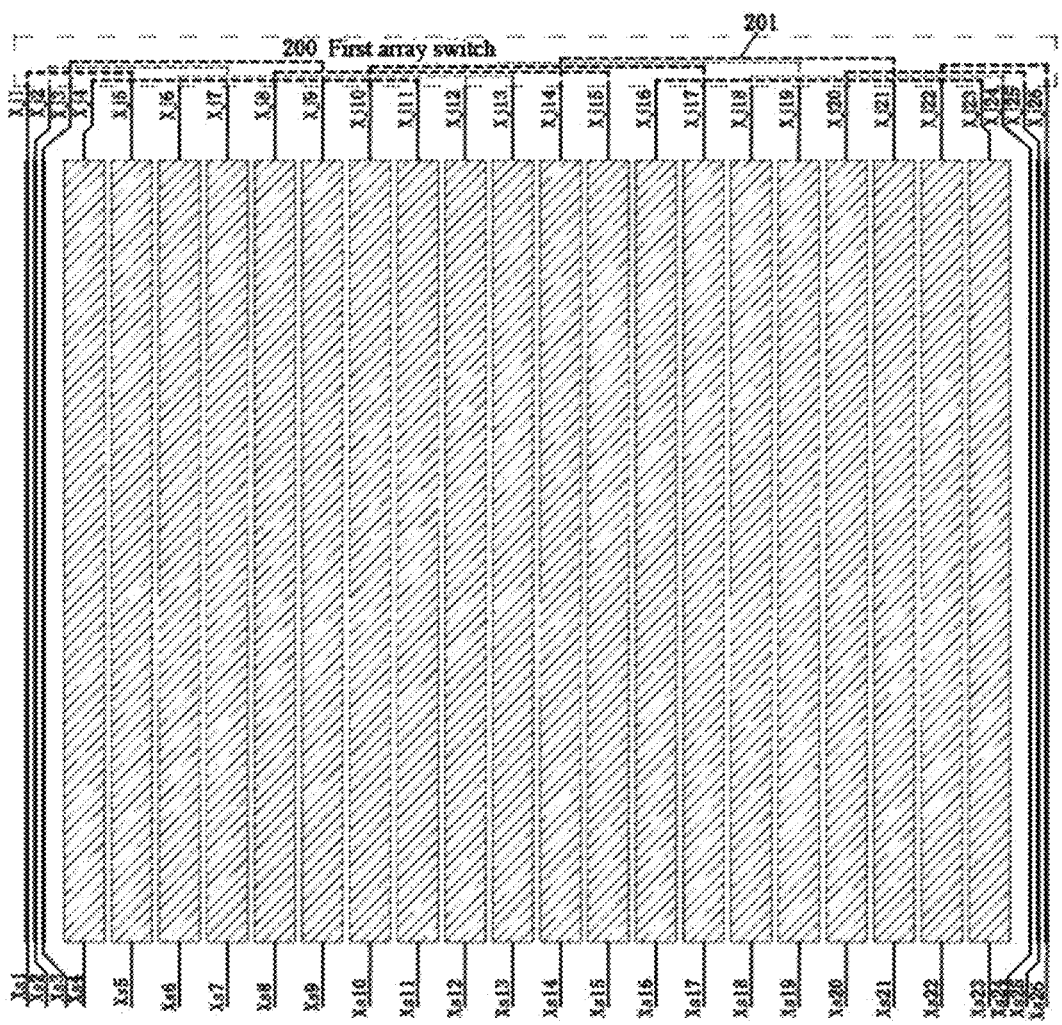
Fig. 7.1

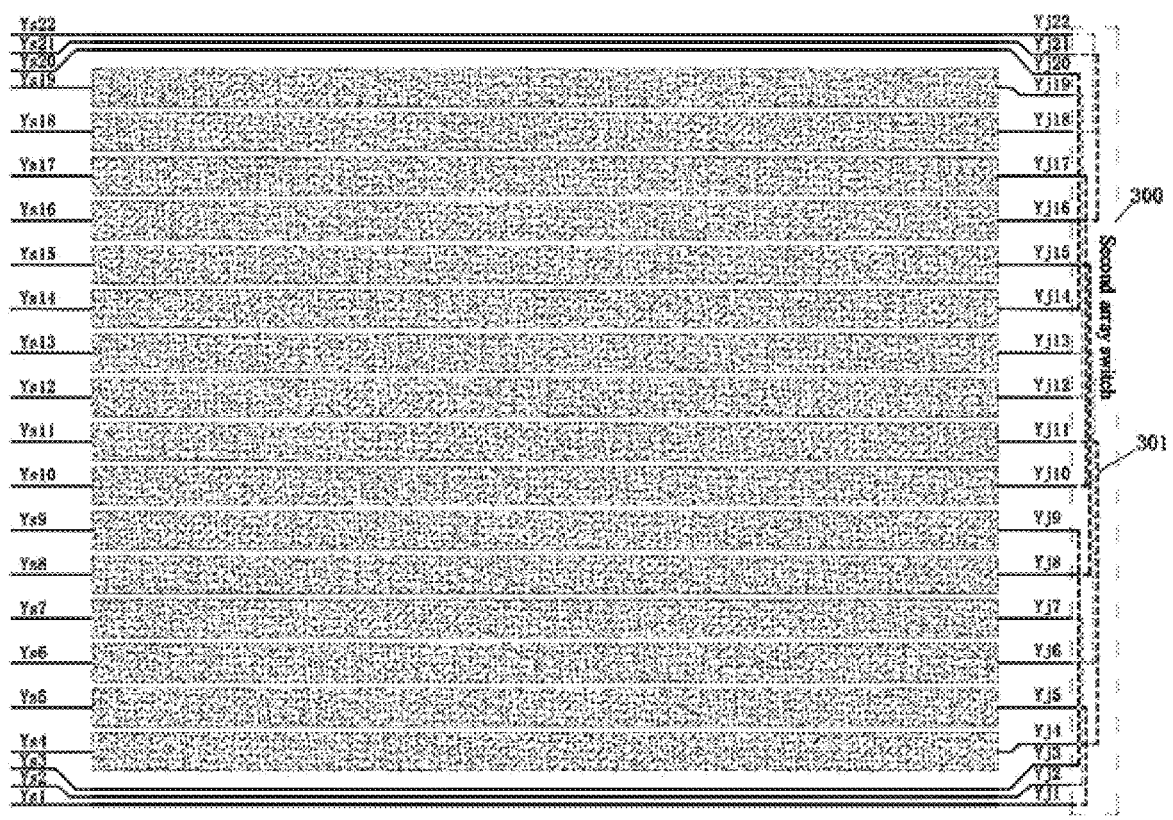
Fig. 7.2

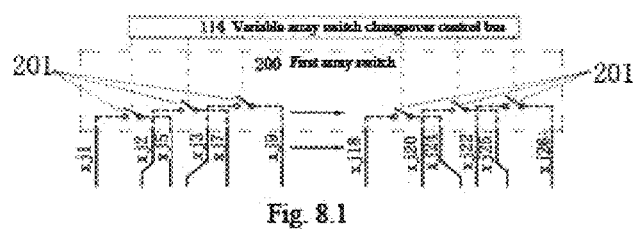
Fig. 8.1
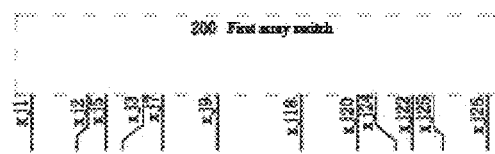
Fig. 8.4
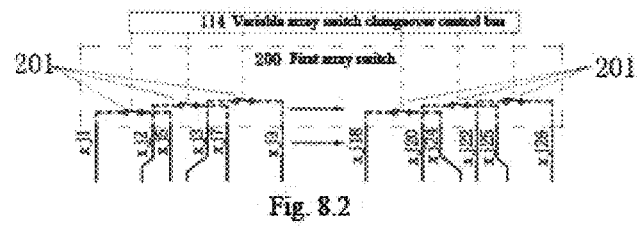
Fig. 8.2
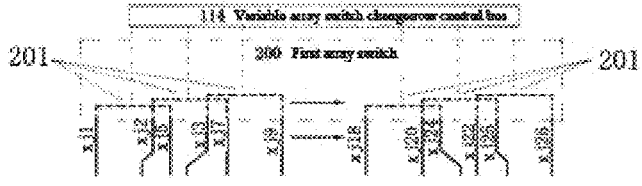
Fig. 8.3

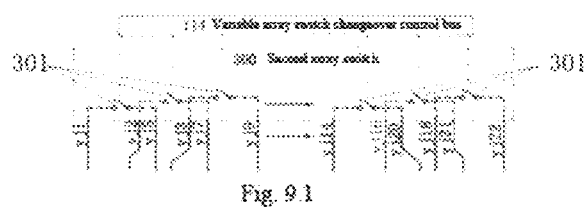
Fig. 9.1
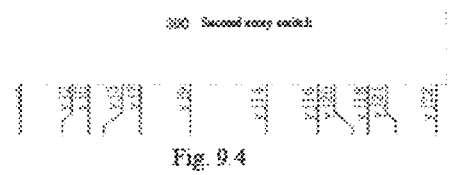
Fig. 9.4
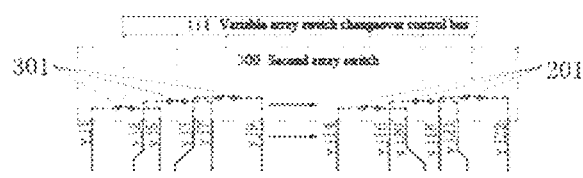
Fig. 9.2
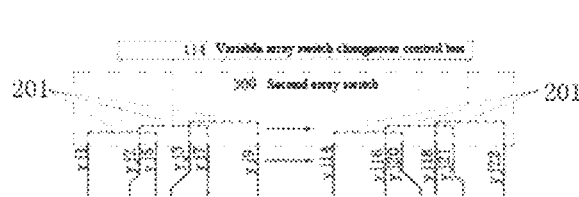
Fig. 9.3

VARIABLE ARRAY DUAL-FUNCTION TOUCH SENSOR, CONTROL DETECTION SYSTEM, TOUCH MODULE AND TOUCH DISPLAY DEVICE

FIELD OF THE INVENTION

The present invention relates to a variable array dual-function touch sensor and a dual-function touch control detection system, and in particular relates to a dual-function touch module and a touch display device.

BACKGROUND OF THE INVENTION

With the development of touch technology, much convenience is brought to people's daily work and lives. A user can directly contact a touch screen by his hand or other object to input information, thus reducing or even eliminating the user's dependence on other input device and facilitating operation of the user. However, different touch ways are also restricted in their application scopes. Hand touch operation is supported by capacitive touch operation function, and electromagnetic stylus touch operation and writing operation with original handwriting are supported by electromagnetic touch operation function. However, products with such touch functions must be correspondingly provided with a capacitive touch sensor module and an electromagnetic touch sensor module respectively. The two sets of touch sensor modules thus lead to a thick structure, complexity, a high cost and unfavorable market promotion and implementation.

Furthermore, various touch ways also have many shortcomings. A capacitive screen, though capable of achieving multi-point touch and stylus touch function, is slow in response speed and low in resolution for stylus and hand touch, and has the shortcoming of relatively low positioning precision. An electromagnetic screen can be used extensively in large size applications and is precise in positioning, but it cannot achieve multi-point touch convenience and man-machine interaction.

SUMMARY OF THE INVENTION

To overcome the above shortcomings, the present invention provides a variable array dual-function touch sensor, wherein one same touch sensor module, and same touch sensor antenna units on the touch sensor module are used; two sets of array switches are turned on and turned off respectively to change touch sensor antenna units, so that the touch sensor is in the form of a capacitive touch antenna array or iii in the form of an electromagnetic touch antenna array, thus achieving manual operation function for capacitive touch and the function of electromagnetic stylus touch operation and writing operation with original-handwriting. The invention also provides an integrated chip of a highly integrated dual-function touch processing system, and a touch display device with double touch functions. The device of the present invention has the advantages of small structural thickness, simple structure, low cost and the like.

The variable array dual-function touch sensor of the present invention is composed of a first-direction antenna array set and a second-direction antenna array set; the first-direction antenna array set is composed of more than one dual-function touch sensor antenna unit in a touch active area, and of more than one solely electromagnetic touch sensor antenna unit outside the touch active area; and the second-direction antenna array set is composed of more than one dual-function touch sensor antenna unit in the touch active area, and of more than one solely electromagnetic touch sensor antenna unit outside the touch active area.

A first included angle of more than 0 degree is formed between the directions of the first-direction antenna array set and the second-direction antenna array set, and the first-direction antenna array set and the second-direction antenna array set are insulated from each other.

The variable array dual-function touch sensor of the present invention may include one insulating substrate, wherein the touch sensor antenna units of the first-direction antenna array set are deposited on one side of the substrate, and the touch sensor antenna units of the second-direction antenna array set are deposited on the other side of the insulating material substrate.

The variable array dual-function touch sensor of the present invention may also include two insulating material substrates, wherein the touch sensor antenna units of the first-direction antenna array set are deposited on one side of the first insulating substrate, and the touch sensor antenna units of the second-direction antenna array set are deposited on one side of the second insulating substrate, and then the first insulating substrate and the second insulating substrate are bonded into one piece by transparent glue.

The antenna units in the touch active area of the variable array dual-function touch sensor are formed by a continuous metal net filled with metal wires of very fine copper or silver or aluminum, or molybdenum, or chromium, or nickel, or iron, or alloy unidentifiable by human eyes with a line width of less than 30 microns.

The filled continuous metal net of the antenna units in the touch active area of the variable array dual-function touch sensor is in the shape of a square, or a rhombus, or a random quadrilateral, or an irregular fiber weaving shape, or an irregular polygon.

The antenna units in the touch active area of the variable array dual-function touch sensor are made of a traditional transparent conductive material of ITO or a transparent conductive material of nanometer silver filaments or any other transparent conductive material.

The figure of the antenna units in the touch active area of the variable array dual-function touch sensor is a rectangular-bar shape, or a hollow-rectangle shape, or a ladder shape, or a shape of series connected rhombuses, or a shape of series connected rectangles, or any shape distributed uniformly.

The touch antenna units outside the touch active area are electromagnetic touch sensor antenna units for use in a solely electromagnetic touch mode, and are non-transparent low-impedance metal wires with a width of less than 1 mm.

The dual-function touch control detection system of the present invention is composed of a touch main control board, a first array switch and a second array switch. The touch main control board is composed of a processor, a signal switching circuit, a capacitive touch signal scanning detection circuit and an electromagnetic touch signal scanning detection circuit; the first array switch includes more than one crossover encoding switch; and the second array switch includes more than one crossover encoding switch; and the first array switch and the second array switch are connected to the touch main control board via a variable array switch changeover control bus. Upper ends of the first-direction antenna array set are connected to the first array switch; right ends of the second-direction antenna array set are connected to the second array switch; and lower ends of the first-direction antenna array set and left ends of the second-direction antenna array set are connected to an input signal bus of the touch main control board.

The touch main control board of the dual-function touch control detection system of the present invention controls, via an input signal bus, crossover encoding switches within the first array switch to be all turned off, and crossover encoding switches within the first array switch to be all turned off, and the variable array dual-function touch sensor is converted to a capacitive touch antenna array.

The touch main control board of the dual-function touch control detection system of the present invention controls, via the input signal bus, the crossover encoding switches within the first array switch to be all turned on, and the crossover encoding switches within the first array switch to be all turned on, and the variable array dual-function touch sensor is converted to an electromagnetic touch antenna array.

The dual-function touch main control board, the first array switch and the second array switch of the dual-function touch control detection system of the present invention may be all integrated in one chip.

The dual-function touch main control board of the dual-function touch control detection system of the present invention may be integrated in one chip, and the first array switch and the second array switch may be integrated in another chip.

The dual-function touch main control board, the first array switch and the second array switch of the dual-function touch control detection system of the present invention may be each integrated in one chip respectively.

The dual-function touch module of the present invention is composed of a variable array dual-function touch sensor and dual-function touch control detection system.

The dual-function touch display device with a dual-function touch module is composed of a dual-function touch module, a display screen transparent panel and a display screen module, wherein the dual-function touch module is arranged between the display screen transparent panel and the display screen module.

BRIEF DESCRIPTION OF THE DRAWINGS

FIG. 8 shows an equivalent circuit diagram of the present invention;

FIG. 9 shows an equivalent circuit diagram of the present invention;

DETAILED DESCRIPTION OF THE EMBODIMENTS

Figure 4:
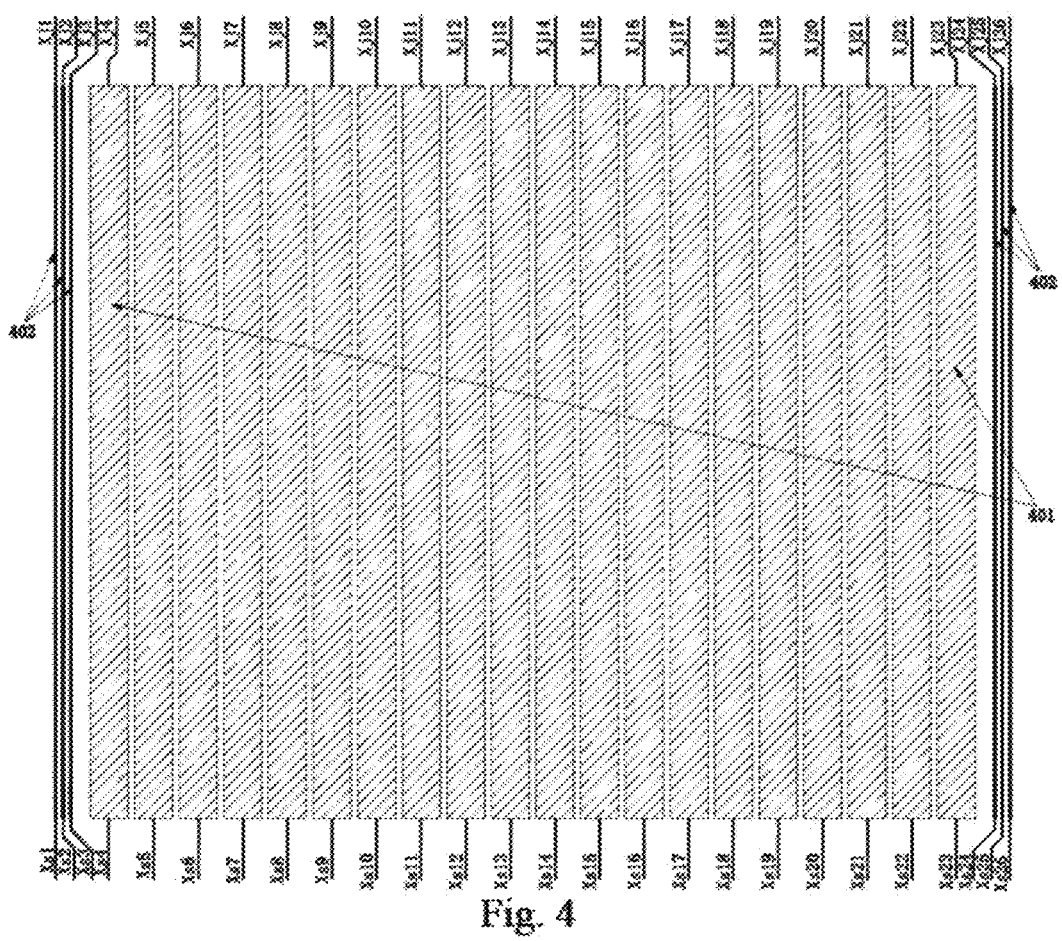
FIG. 4 shows a dual-function touch first-direction antenna array of the present invention.
Figure 5:
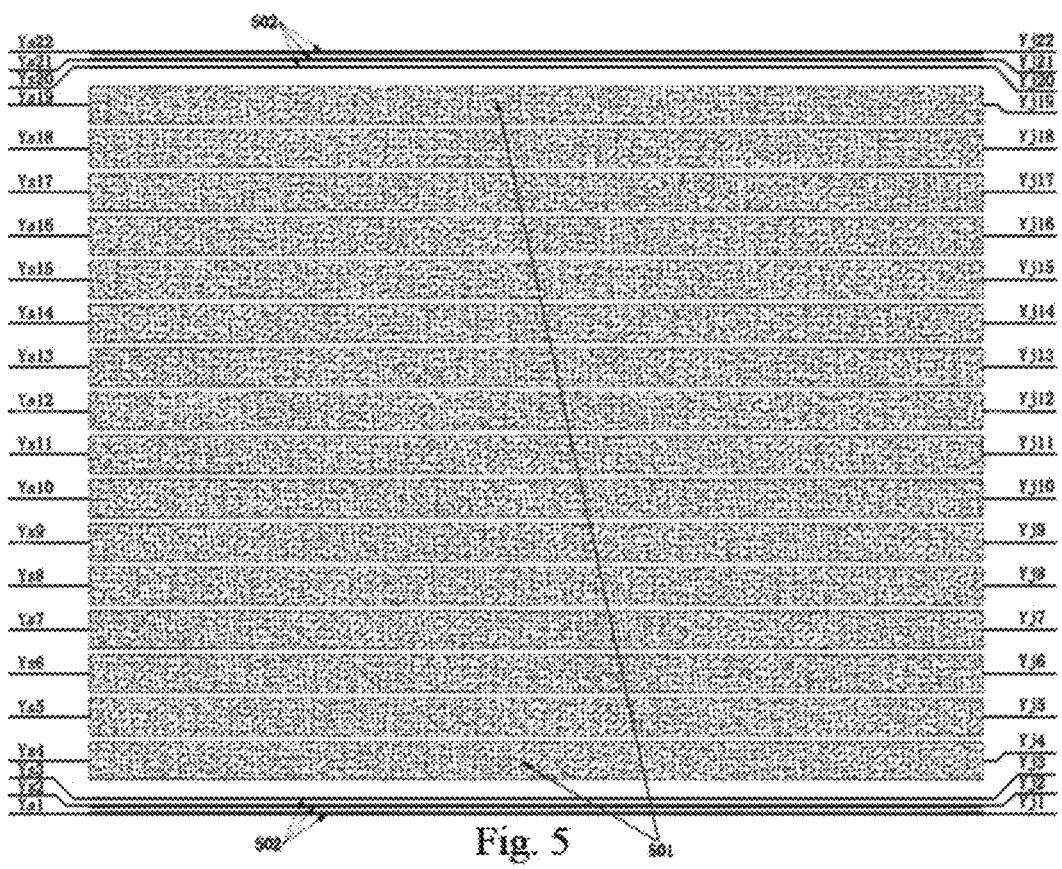
FIG. 5 shows a dual-function touch second-direction antenna array of the present invention.

A variable array dual-function touch sensor (FIG. 3) of the present invention is composed of a first-direction antenna array set (FIG. 4) and a second-direction antenna array set (FIG. 5). The first-direction antenna array set (FIG. 4) is composed of more than one dual-function touch sensor antenna unit (401) in a touch active area, and of more than one solely electromagnetic touch sensor antenna unit (402) outside the touch active area; and the second-direction antenna array set (FIG. 5) is composed of more than one dual-function touch sensor antenna unit (501) in the touch active area, and of more than one solely electromagnetic touch sensor antenna unit (502) outside the touch active area.

A first included angle of more than 0 degree is formed between the directions of the first-direction antenna array set (FIG. 4) and the second-direction antenna array set (FIG. 5), and the first-direction antenna array set (FIG. 4) and the second-direction antenna array set (FIG. 5) are insulated from each other.

Figure 10:
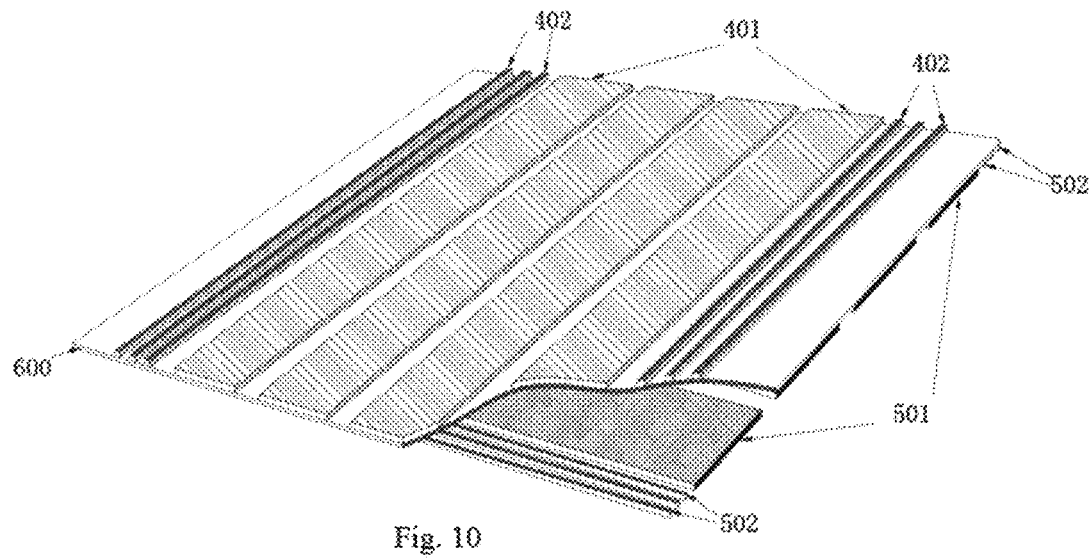
FIG. 10 shows a schematic diagram of a single-layer material structure of a dual-function touch module of the present invention.

FIG. 10 shows a structure implementation of the variable array dual-function touch sensor (FIG. 3) of the present invention. It is formed with the touch sensor antenna units (401 and 402) of the first-direction antenna array set (FIG. 4) deposited on one side of a first insulating material substrate (600). Then the touch sensor antenna units (501 and 502) of the second-direction antenna array set (FIG. 5) are deposited on the other side of the first insulating material substrate (600). In this way, the variable array dual-function touch sensor of the present invention is formed using the single layer of insulating substrate as a carrier.

Figure 11:
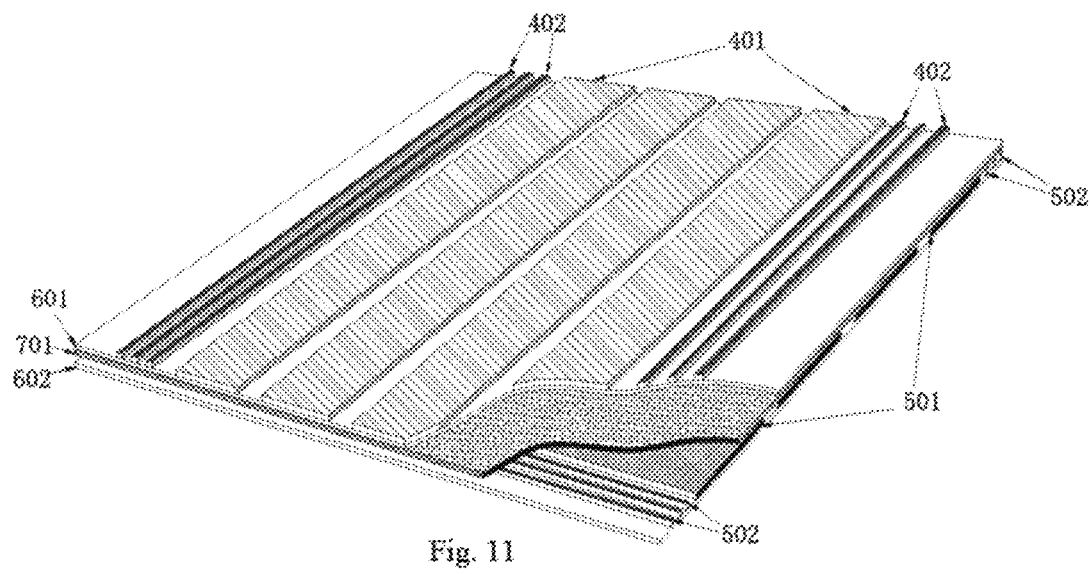
FIG. 11 shows a schematic diagram of a double-layer material structure of a dual-function touch module of the present invention.

FIG. 11 shows another structure implementation of the variable array dual-function touch sensor (FIG. 3) of the present invention. It has two insulating material substrates, i.e. a first insulating substrate (601) and a second insulating substrate (602), wherein the touch sensor antenna units (401 and 402) of the first-direction antenna array set (FIG. 4) are deposited on one side of the first insulating substrate 601, and the touch sensor antenna units (501 and 502) of the second-direction antenna array set (FIG. 5) are deposited on one side of the second insulating substrate 602; and then the first insulating substrate (601) and the second insulating substrate (602) are bonded into one piece by transparent glue 701, thus forming the variable array dual-function touch sensor of the present invention.

Figure 12:
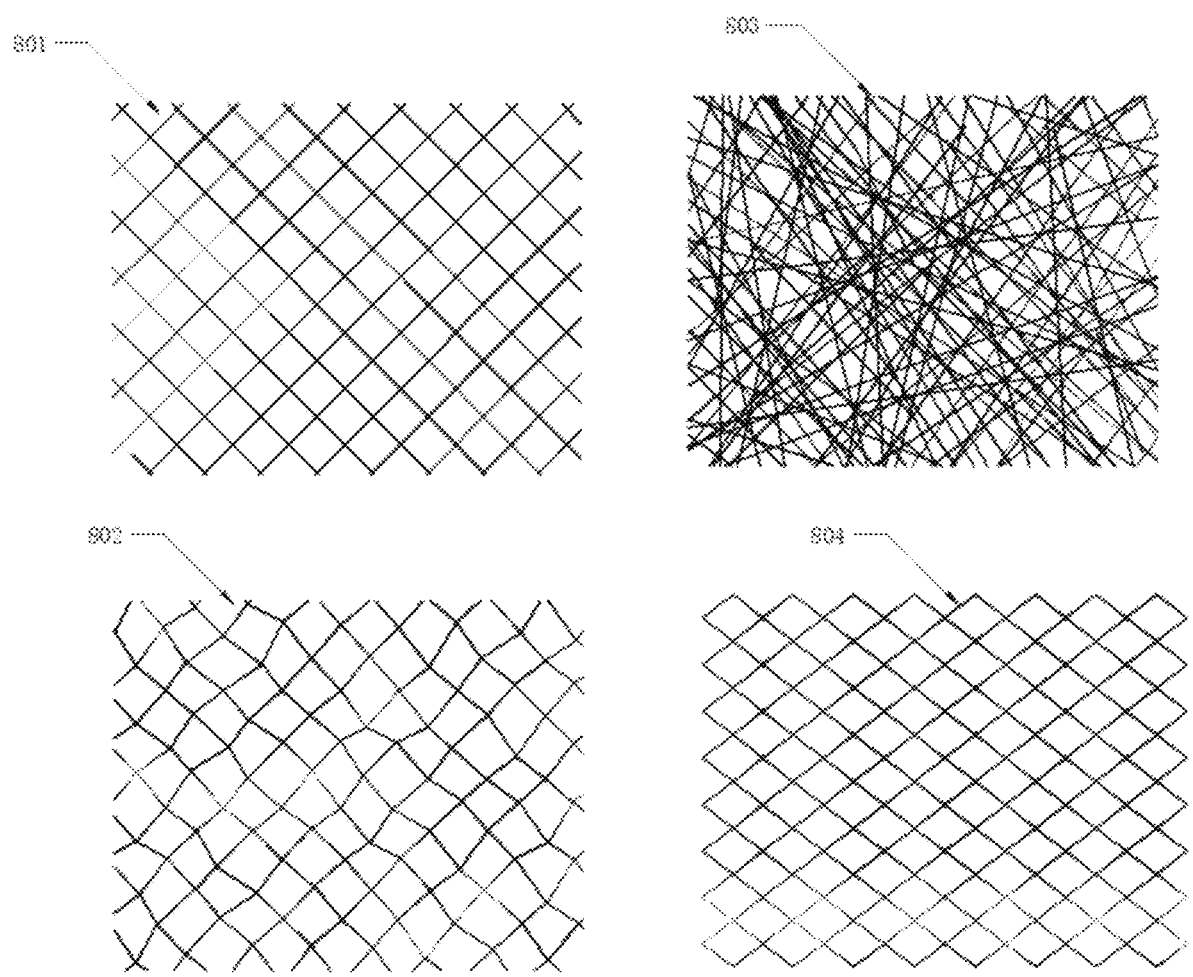
FIG. 12 shows a schematic diagram of an antenna unit metal net of a dual-function touch sensing antenna array of the present invention.

FIG. 12 shows the variable array dual-function touch sensor of the present invention. The antenna units in the touch active area of the variable array dual-function touch sensor (FIG. 3) of the present invention are preferably made of a conductive material of a continuous metal net filled with metal wires of very fine copper or silver or aluminum, or molybdenum, or chromium, or nickel, or iron, or alloy unidentifiable by human eyes with a line width of less than 30 microns. The continuous metal net may have square meshes (801). In order to eliminate the Moore phenomenon caused by light interference between the mesh cycle of metal meshes forming the present dual-function touch module antenna units and the cycle of pixel point lattices of a display screen behind, which affects image effect of a display module behind a dual-function touch module (332), the inventor explored with research and experiments and found that the microscopic figure of the conductive material of the continuous metal net may be a rhombus (804), may be a random quadrilateral (802), may be an irregular fiber weaving shape (803), and may also be an irregular polygon. Such a touch sensing antenna formed by the low-impedance continuous metal net is low in impedance, high in signal to noise ratio and highly sensitive in touch operations, and can achieve a design application of an oversized variable array dual-function touch sensor larger than 100 inches.

The antenna units (401 and 501) in the touch active area of the variable array dual-function touch sensor (FIG. 3) of the present invention may be preferably made of a traditional transparent conductive material of ITO or low-impedance nanometer silver filaments or any other transparent conductive material.

Figure 13:
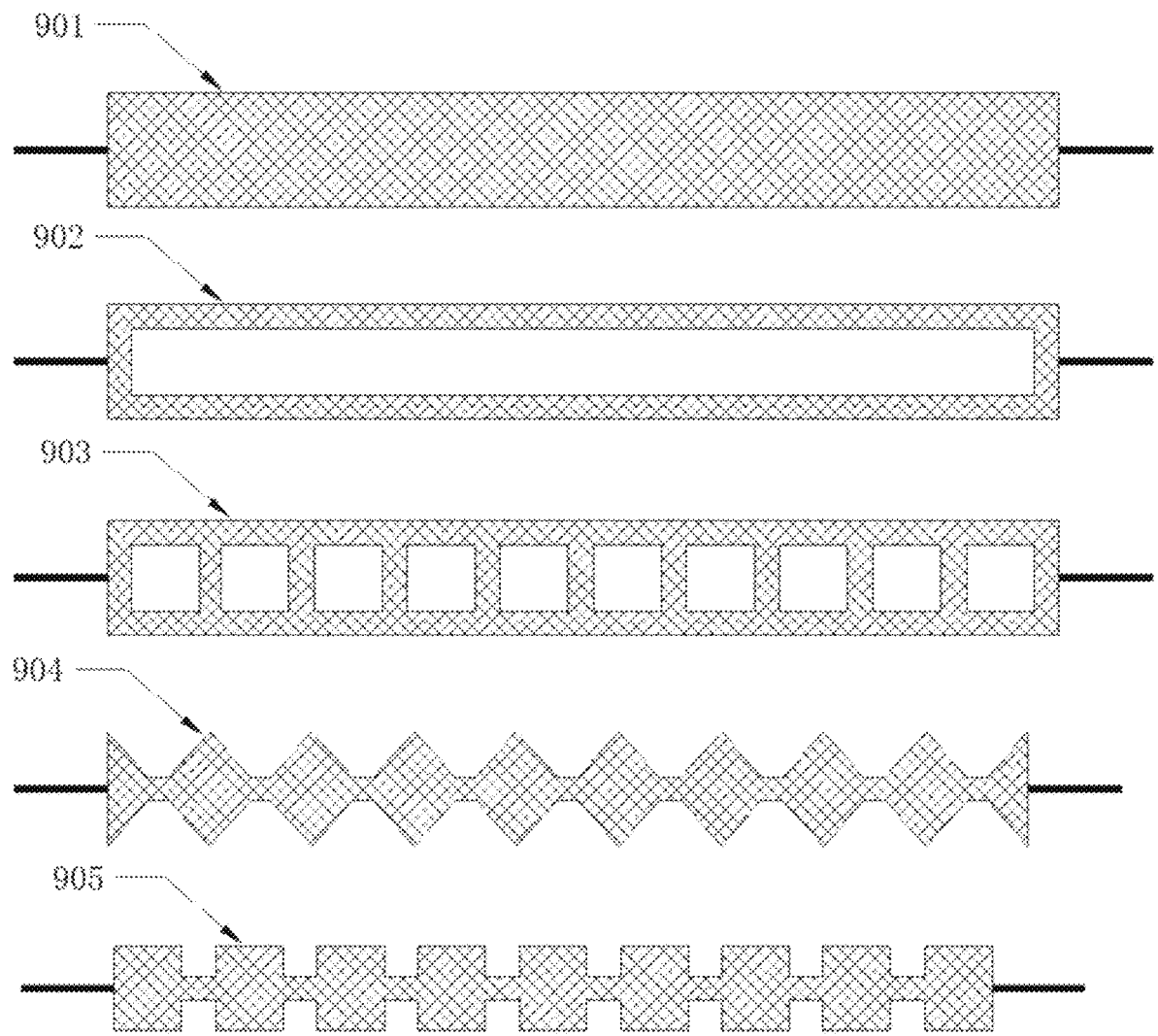
FIG. 13 shows a schematic diagram of an antenna unit of a dual-function touch sensing antenna array of the present invention.
Figure 14:
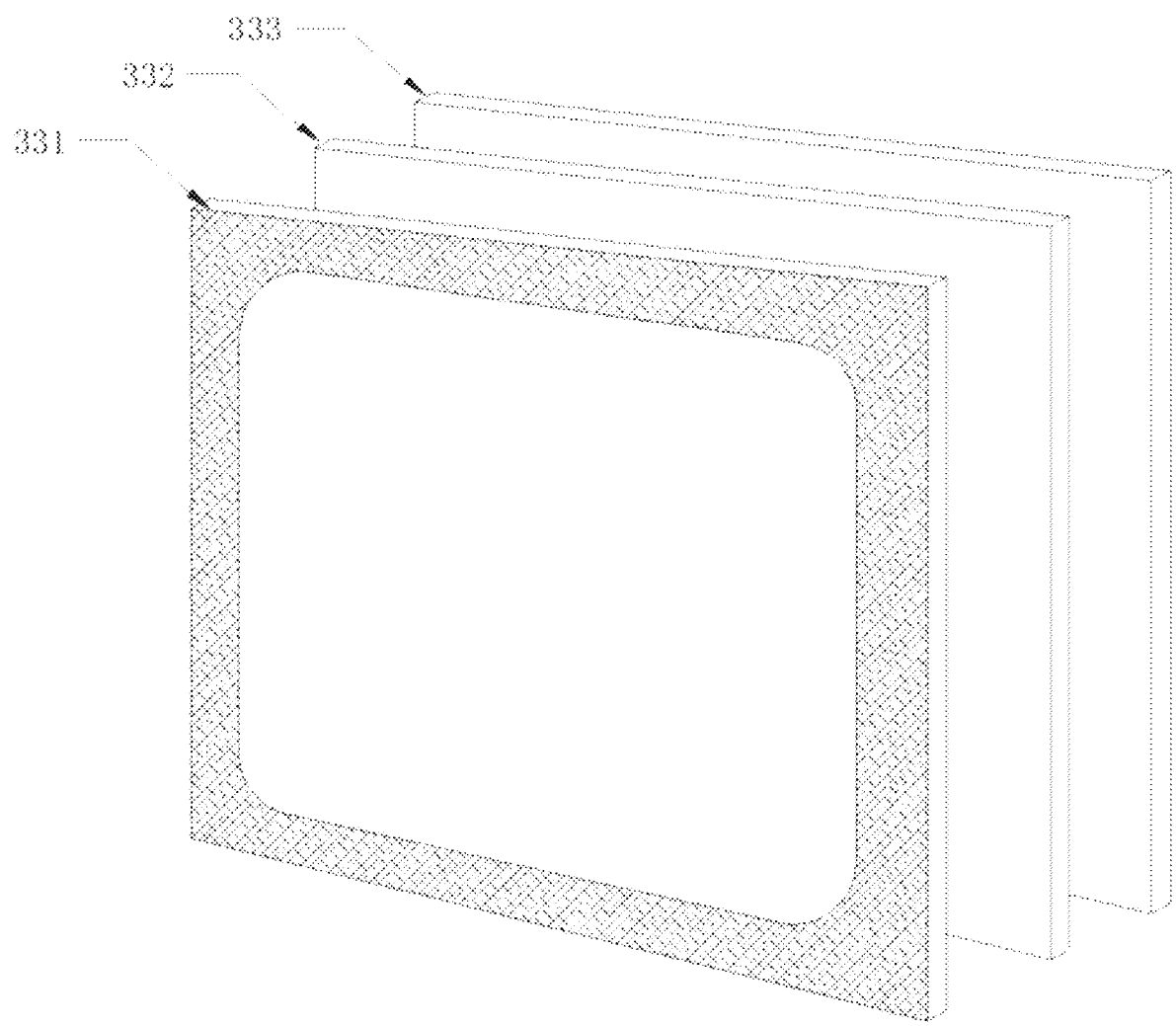
FIG. 14 shows a schematic structural diagram of a touch display device of the present invention.

FIG. 13 shows figures of the antenna units in the touch active area of the variable array dual-function touch sensor (FIG. 3) of the present invention. The figure may be a rectangular-bar shape (901), may be a hollow-rectangle shape (902), may be a ladder shape (903), may be a shape of series connected rhombuses (904), may be a shape of series connected rectangles (905), and may be any shape distributed uniformly.

Figure 1:
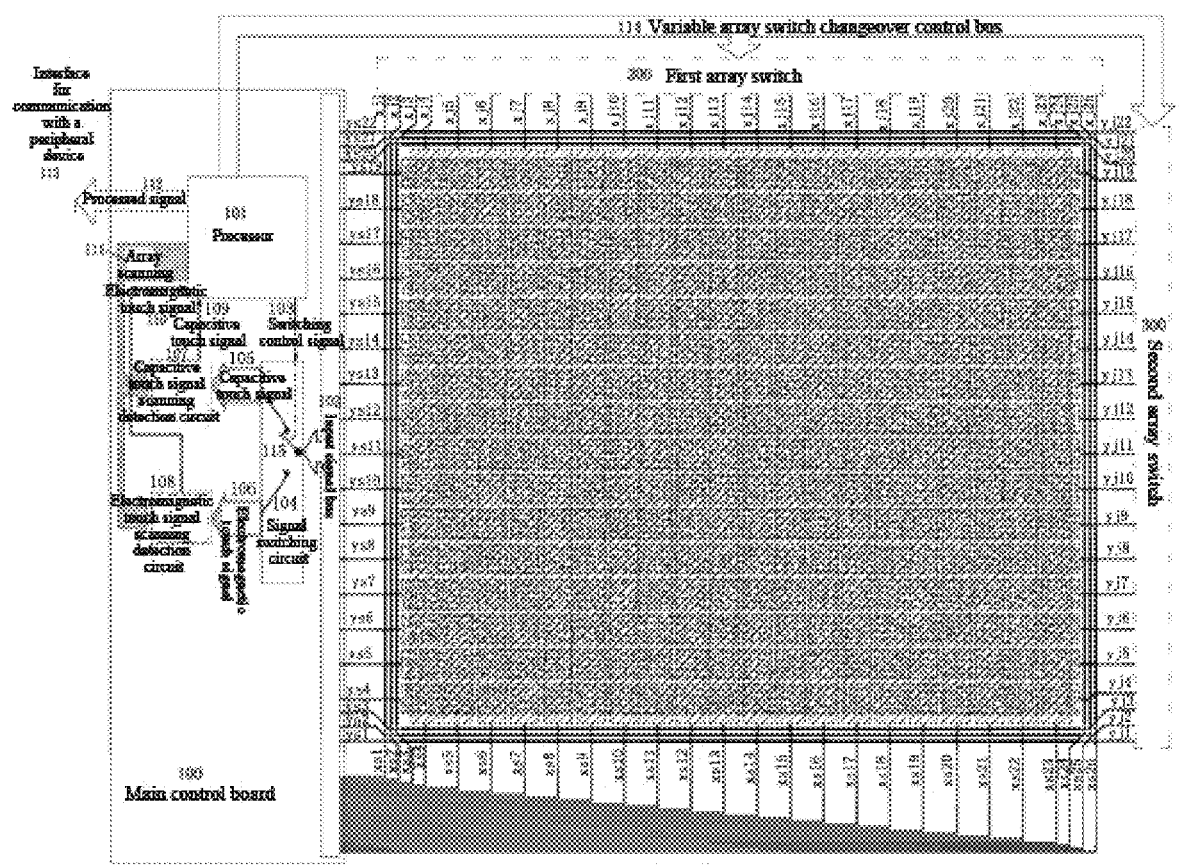
FIG. 1 shows a dual-function touch module of the present invention.
Figure 2:
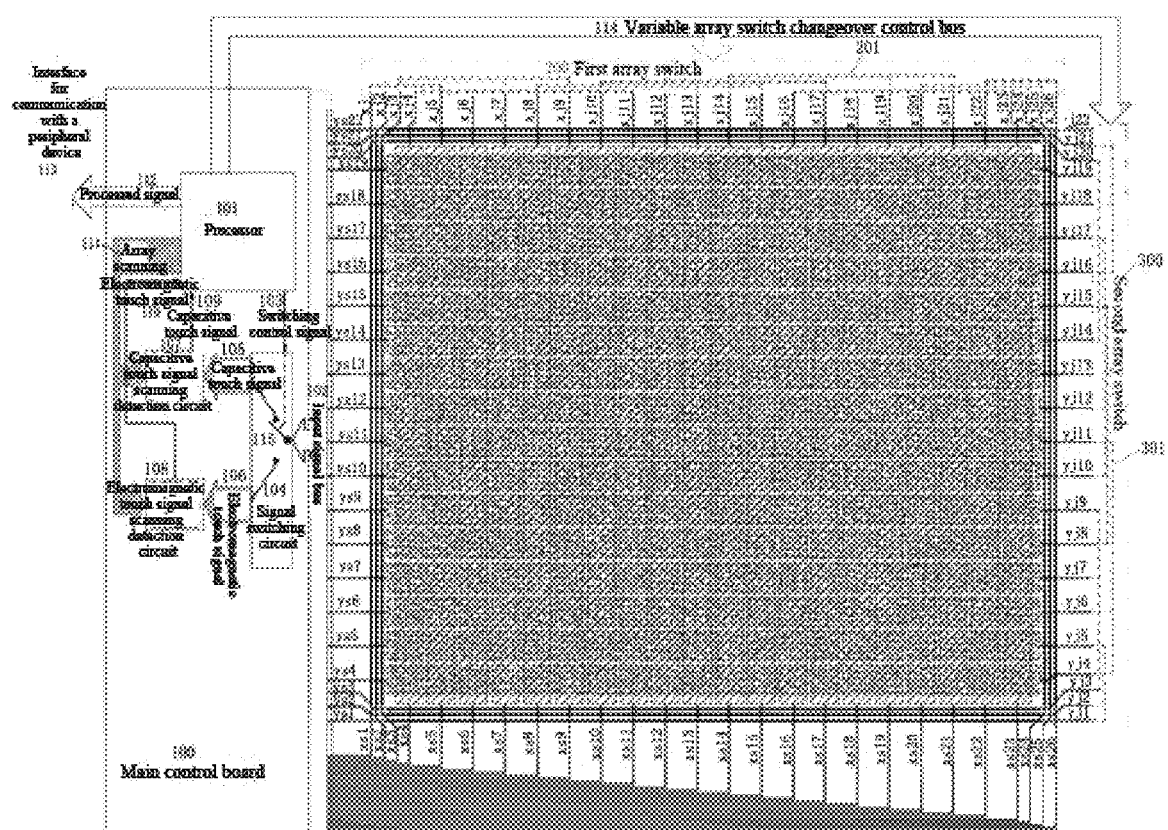
FIG. 2 shows a dual-function touch module of the present invention.
Figure 3:
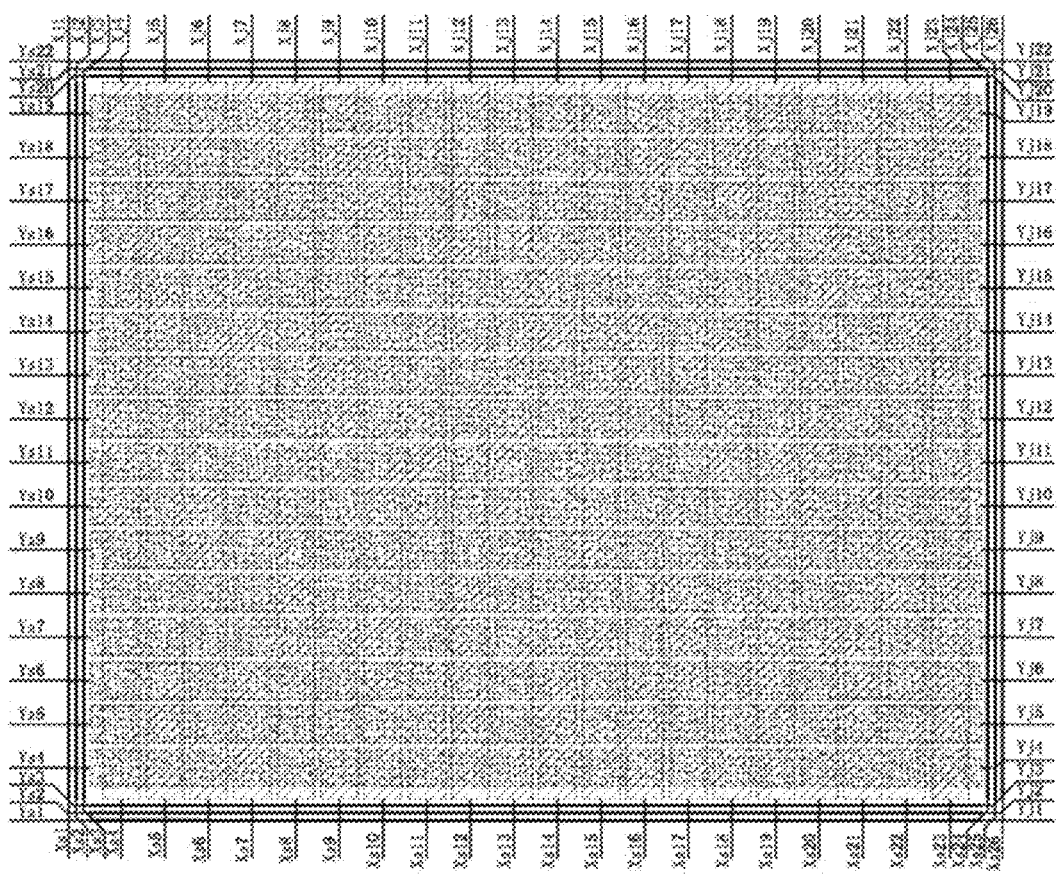
FIG. 3 shows dual-function touch sensing antenna arrays of the present invention.

The touch antenna units outside the touch active area of the variable array dual-function touch sensor (FIG. 3) of the present invention may be electromagnetic touch sensor antenna units for use in a solely electromagnetic touch mode, and are non-transparent low-impedance metal wires (402 and 502) with a width of less than 1 mm, such that the wiring space outside the touch area can be saved to facilitate wiring design of the dual-function touch sensor (FIG. 3).

FIGS. 10, 11, 13 and 14 only provide schematic structural diagrams for manufacturing simplest antenna array sets. Other structures are same as the circuit structures described above, and are not repeated here.

A dual-function touch control detection system of the present invention is composed of a main control board (100), a first array switch (200) and a second array switch (300). The touch main control board (100) is composed of a processor (101), a signal switching circuit (104), a capacitive touch signal scanning detection circuit (107) and an electromagnetic touch signal scanning detection circuit (108); the first array switch (200) includes more than one crossover encoding switch (201); and the second array switch (300) includes more than one crossover encoding switch (301).

Xj1 to Xj26 of the first-direction antenna array set (FIG. 4) are connected to the first array switch 200; and Yj1 to Yj22 of the second-direction antenna array set (FIG. 5) are connected to the second array switch 300.

Xs1 to Xs26 of the first-direction antenna array set (FIG. 4) and Ys1 to Ys22 of the second-direction antenna array set (FIG. 5) are connected to an input signal bus 102 of the touch main control board (100).

The first array switch 200 and the second array switch 300 are connected to the touch main control board 100 via a variable array switch changeover control bus 114.

Figure 6:
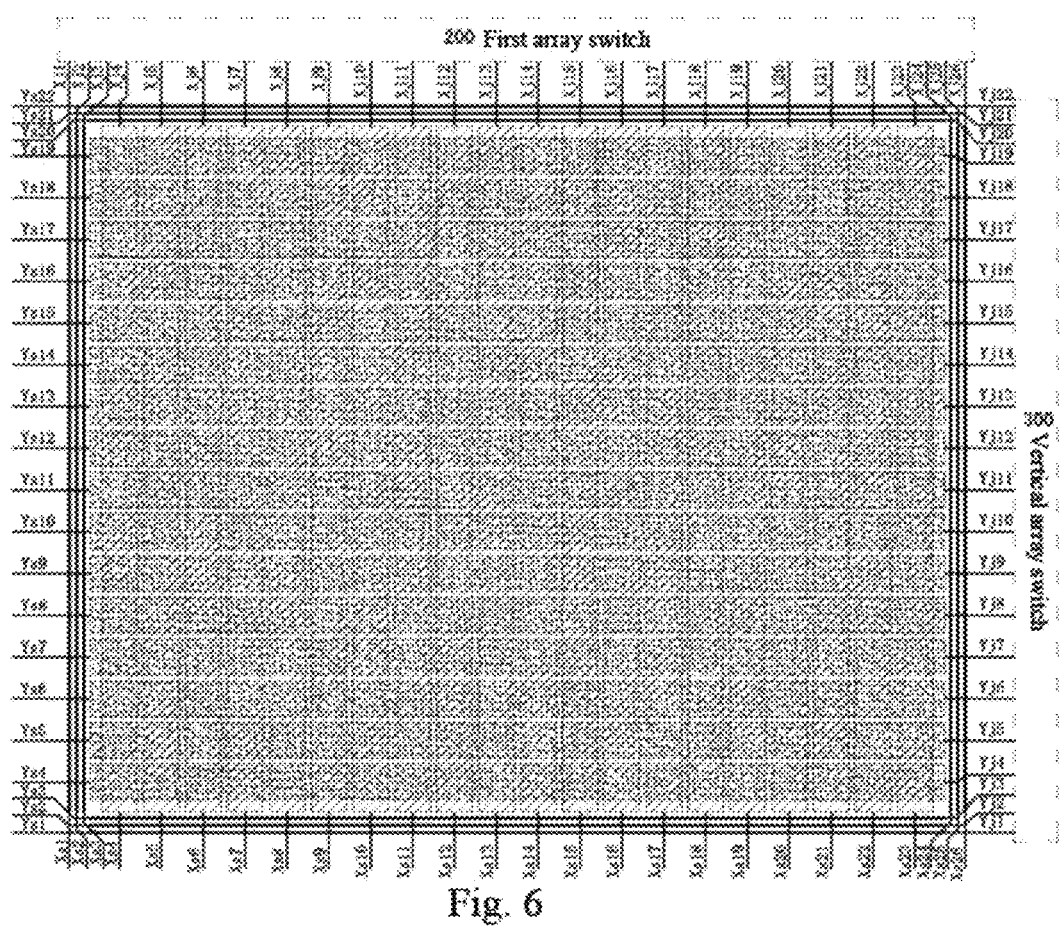
FIG. 6 shows a capacitive touch antenna array of the present invention.

Preferably, the touch main control board (100) controls, via the input signal bus (114), the crossover encoding switches (201) within the first array switch (200) to be all turned off; FIG. 8.1 is an equivalent diagram of the first array switch (200), and FIG. 8.4 is an equivalent diagram of FIG. 8.1, i.e. Xj1 to Xj26 are suspended, and the first-direction antenna array set (FIG. 4) is converted to a capacitive touch first-direction antenna array set (FIG. 6.1); and the touch main control board (100) controls, via the input signal bus 114, the crossover encoding switches (301) within the second array switch (300) to be all turned off; FIG. 9.1 is an equivalent diagram of the second array switch (300) where the crossover encoding switches 301 within the second array switch (300) are all turned off, and FIG. 9.4 is an equivalent diagram of FIG. 9.1, i.e. Yj1 to Yj22 are suspended, and the second-direction antenna array set (FIG. 5) is converted to a capacitive touch second-direction antenna array set (FIG. 6.2), and the first-direction antenna array set (FIG. 4) and the second-direction antenna array set (FIG. 5) are converted to a capacitive touch array set, i.e. the variable array dual-function touch sensor (FIG. 3) is converted to a capacitive touch antenna array (FIG. 6); when the crossover encoding switches 201 within the first array switch (200) are all turned off, Xj1 to Xj26 are suspended, and the first-direction antenna array set (FIG. 4) is converted to the capacitive touch first-direction antenna array set (FIG. 6.1), and at the same time Xs1 to Xs26 of the capacitive touch first-direction antenna array set outputs a capacitive touch signal to the input signal bus (102) of the touch main control board (100); and when the crossover encoding switches 301 within the second array switch (300) are all turned off, Yj1 to Yj22 are suspended, and the second-direction antenna array set (FIG. 5) is converted to the capacitive touch second-direction antenna array set (FIG. 6.2), and at the same time Xs1 to Xs26 of the capacitive touch second-direction antenna array set (FIG. 6.2) outputs a capacitive touch signal to the an input signal bus (102) of the touch main control board 100.

Figure 7:
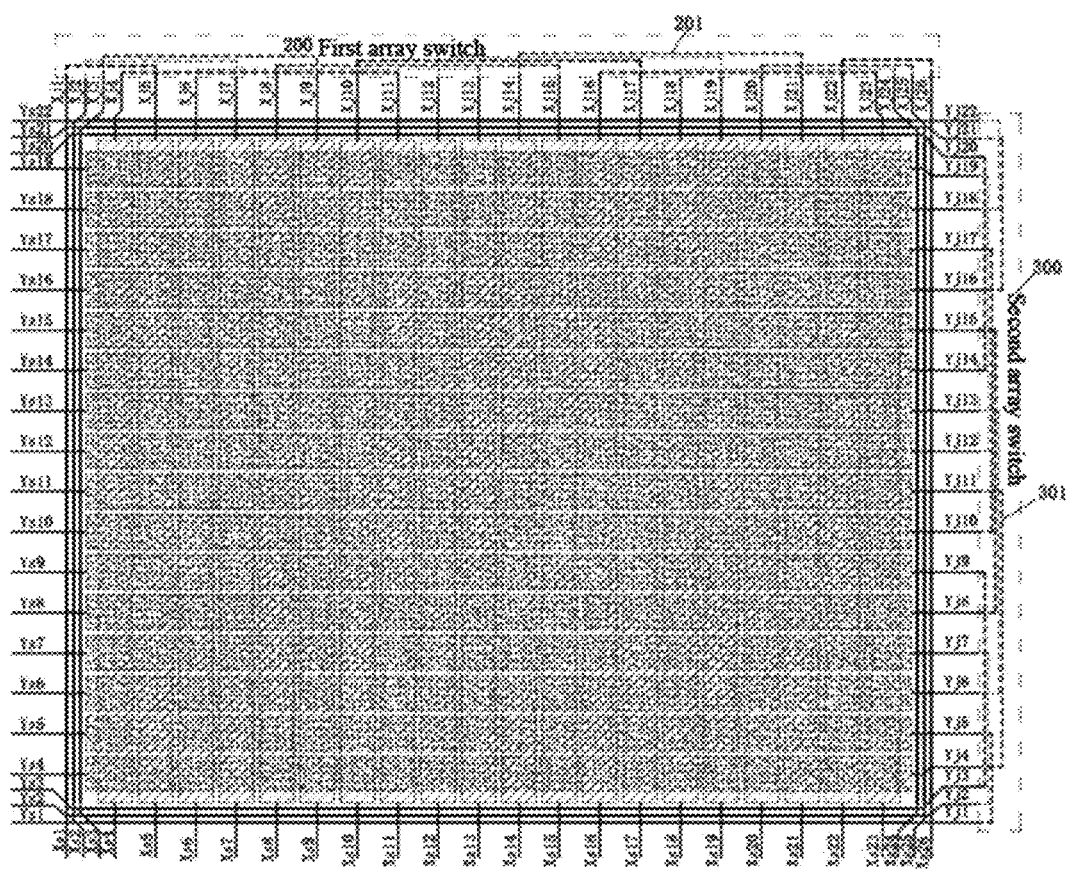
FIG. 7 shows an electromagnetic touch antenna array of the present invention.

Preferably, the touch main control board (100) controls, via the input signal bus 114, the crossover encoding switches (201) within the first array switch (200) to be all turned on; FIG. 8.2 is an equivalent diagram of the first array switch (200), and FIG. 8.3 is an equivalent diagram of FIG. 8.2, i.e. Xj1 to Xj26 are connected across non-adjacent ones by the crossover switches, and the first-direction antenna array set (FIG. 4) is converted to an electromagnetic touch first-direction antenna array set (FIG. 7.1); and the touch main control board (100) controls, via the input signal bus 114, the crossover encoding switches (301) within the second array switch (300) to be all turned on; FIG. 9.2 is an equivalent diagram of the second array switch (300), and FIG. 9.3 is an equivalent diagram of FIG. 9.2, i.e. Yj1 to Yj22 are connected across non-adjacent ones by the crossover switches, and the second-direction antenna array set (FIG. 5) is converted to an electromagnetic touch second-direction antenna array set (FIG. 7.2), and the first-direction antenna array set (FIG. 4) and the second-direction antenna array set (FIG. 5) are converted to an electromagnetic touch array set, i.e. the variable array dual-function touch sensor (FIG. 3) is converted to an electromagnetic touch antenna array (FIG. 7); when the crossover encoding switches (201) within the first array switch (200) are all turned on, Xj1 to Xj26 are connected across non-adjacent ones by the crossover switches, and the first-direction antenna array set (FIG. 4) is converted to the electromagnetic touch first-direction antenna array set (FIG. 7.1), and at the same time Xs1 to Xs26 of the electromagnetic touch first-direction antenna array set (FIG. 7.1) outputs an electromagnetic touch signal to the input signal bus (102) of the touch main control board (100); and when the crossover encoding switches (301) within the second array switch (300) are all turned on, Yj1 to Yj22 are connected across non-adjacent ones by the crossover switches, and the second-direction antenna array set (FIG. 5) is converted to the electromagnetic touch second-direction antenna array set (FIG. 7.2), and at the same time Xs1 to Xs26 of the electromagnetic touch second-direction antenna array set (FIG. 7.2) outputs an electromagnetic touch signal to the input signal bus (102) of the touch main control board (100).

When the touch main control board (100) of the dual-function touch control detection system of the present invention converts the variable array dual-function touch sensor (FIG. 3) into the capacitive touch antenna array (FIG. 6), the capacitive touch signal (105) on the input signal bus (102) of the touch main control board (100) is switched to the capacitive touch signal scanning detection circuit (107), which is controlled by an array scanning bus 111 to demodulate it into a capacitive touch signal (109), which is then processed by the processor (101) into a capacitive touch corresponding signal (112) and transmitted to a peripheral interface (113), thus achieving the whole process of conversion from the variable array dual-function touch sensor (FIG. 3) to the capacitive touch antenna array (FIG. 6), capacitive touch signal switching, scanning detection and processing; and when the touch main control board (100) of the system converts the variable array dual-function touch sensor (FIG. 3) into the electromagnetic touch antenna array (FIG. 7), the electromagnetic touch signal (106) on the input signal bus (102) of the touch main control board (100) is switched to the electromagnetic touch signal scanning detection circuit (108), which is controlled by the array scanning bus (111) to demodulate it into an electromagnetic touch signal (110), which is then processed by the processor (101) into an electromagnetic touch corresponding signal (112) and transmitted to the peripheral interface (113), thus achieving the whole process of conversion from the variable array dual-function touch sensor (FIG. 3) to the electromagnetic touch antenna array (FIG. 7), electromagnetic touch signal switching, scanning detection and processing.

Preferably, the dual-function touch main control board (100), the first array switch (200) and the second array switch (300) are all integrated in one chip.

Preferably, the dual-function touch main control board (100) is integrated in one chip, and the first array switch (200) and the second array switch (300) are integrated in another chip.

Preferably, the dual-function touch main control board (100), the first array switch (200) and the second array switch (300) are each integrated in one chip respectively.

The present invention also discloses a dual-function touch module (332) including the variable array dual-function touch sensor (FIG. 3) and dual-function touch control detection system as described above.

The present invention also discloses a touch display device (FIG. 15) with a dual-function touch module (332), including the dual-function touch module (332) described above, a display screen transparent panel (331) and a display screen module (333), wherein the dual-function touch module (332) is arranged between the display screen transparent panel (331) and the display screen module (333).

The invention claimed is:

1. A dual-function touch control detection system, comprising a touch main control board, a first array switch and a second array switch, wherein
the touch main control board is composed of a processor, a signal switching circuit, a capacitive touch signal scanning detection circuit and an electromagnetic touch signal scanning detection circuit;
the touch main control board controls a variable array dual-function touch sensor comprising a first-direction antenna array set and a second-direction antenna array set, wherein
the first-direction antenna array set is composed of more than one dualfunction touch sensor antenna unit in a touch active area, and of more than one solely electromagnetic touch sensor antenna unit outside the touch active area;
the second-direction antenna array set is composed of more than one dual-function touch sensor antenna unit in the touch active area, and of more than one solely electromagnetic touch sensor antenna unit outside the touch active area; and
a first included angle of more than 0 degree is formed between the directions of the first-direction antenna array set and the second-direction antenna array set, and the first-direction antenna array set and the second-direction antenna array set are insulated from each other;
the first array switch comprises more than one crossover encoding switch; and
the second array switch comprises more than one crossover encoding switch;
wherein
the first array switch and the second array switch are connected to the main control board via a variable array switch changeover control bus;
upper ends of the first-direction antenna array set are connected to the first array switch; and
right ends of the second-direction antenna array set are connected to the second array switch; and
lower ends of the first-direction antenna array set and left ends of the second-direction antenna array set are connected to an input signal bus of the touch main control board;
wherein
the touch main control board controls, via an input signal bus, crossover encoding switches within the first array switch to be all turned off, and crossover encoding switches within the second array switch to be all turned off, and the variable array dual-function touch sensor is converted to a capacitive touch antenna array;
the touch main control board controls, via the input signal bus, the crossover encoding switches within the first array switch to be all turned on, and the crossover encoding switches within the second array switch to be all turned on, and the variable array dual-function touch sensor is converted to an electromagnetic touch antenna array;
when the variable array dual-function touch sensor is converted into the capacitive touch antenna array, an acapacitive touch signal on the input signal bus of the touch main control board is switched to the capacitive touch signal scanning detection circuit, which is controlled by an array scanning bus to demodulate it into a capacitive touch signal, which is then processed by the processor into a capacitive touch corresponding signal and transmitted to a peripheral interface, thus achieving the whole process of conversion from the variable array dual-function touch sensor to the capacitive touch antenna array, capacitive touch signal switching, scanning detection and processing; and
when the variable array dual-function touch sensor is converted into the electromagnetic touch antenna array, an electromagnetic touch signal on the input signal bus of the touch main control board is switched to the electromagnetic touch signal scanning detection circuit, which is controlled by the array scanning bus to demodulate it into an electromagnetic touch signal, which is then processed by the processor into an electromagnetic touch corresponding signal and transmitted to the peripheral interface, thus achieving the whole process of conversion from the variable array dual-function touch sensor to the electromagnetic touch antenna array, electromagnetic touch signal switching, scanning detection and processing.

2. The dual-function touch control detection system of claim 1, wherein the dual-function touch main control board, the first array switch and the second array switch are all integrated in one chip.

3. The dual-function touch control detection system of claim 1, wherein the dual-function touch main control board is integrated in one chip, and the first array switch and the second array switch are integrated in another chip.

4. The dual-function touch control detection system of claim 1, wherein the dual-function touch main control board, the first array switch and the second array switch are each integrated in one chip respectively.

5. A dual-function touch module, comprising a variable array dualfunction touch sensor and a dual-function touch control detection system comprising a touch main control board, a first array switch and a second array switch, wherein
   the touch main control board is composed of a processor, a signal switching circuit, a capacitive touch signal scanning detection circuit and an electromagnetic touch signal scanning detection circuit;
   the touch main control board controls a variable array dual-function touch sensor comprising a first-direction antenna array set and a second-direction antenna array set, wherein
     the first-direction antenna array set is composed of more than one dualfunction touch sensor antenna unit in a touch active area, and of more than one solely electromagnetic touch sensor antenna unit outside the touch active area;
     the second-direction antenna array set is composed of more than one dual-function touch sensor antenna unit in the touch active area, and of more than one solely electromagnetic touch sensor antenna unit outside the touch active area; and
     a first included angle of more than 0 degree is formed between the directions of the first-direction antenna array set and the second-direction antenna array set, and the first-direction antenna array set and the second-direction antenna array set are insulated from each other;
the first array switch comprises more than one crossover encoding switch; and
the second array switch comprises more than one crossover encoding switch;
wherein
the first array switch and the second array switch are connected to the main control board via a variable array switch changeover control bus;
upper ends of the first-direction antenna array set are connected to the first array switch; and
right ends of the second-direction antenna array set are connected to the second array switch; and
   lower ends of the first-direction antenna array set and left ends of the second-direction antenna array set are connected to an input signal bus of the touch main control board;
wherein
the touch main control board controls, via an input signal bus, crossover encoding switches within the first array switch to be all turned off, and crossover encoding switches within the second array switch to be all turned off, and the variable array dual-function touch sensor is converted to a capacitive touch antenna array;
the touch main control board controls, via the input signal bus, the crossover encoding switches within the first array switch to be all turned on, and the crossover encoding switches within the second array switch to be all turned on, and the variable array dual-function touch sensor is converted to an electromagnetic touch antenna array;
when the variable array dual-function touch sensor is converted into the capacitive touch antenna array, an acapacitive touch signal on the input signal bus of the touch main control board is switched to the capacitive touch signal scanning detection circuit, which is controlled by an array scanning bus to demodulate it into a capacitive touch signal, which is then processed by the processor into a capacitive touch corresponding signal and transmitted to a peripheral interface, thus achieving the whole process of conversion from the variable array dual-function touch sensor to the capacitive touch antenna array, capacitive touch signal switching, scanning detection and processing; and
when the variable array dual-function touch sensor is converted into the electromagnetic touch antenna array, an electromagnetic touch signal on the input signal bus of the touch main control board is switched to the electromagnetic touch signal scanning detection circuit, which is controlled by the array scanning bus to demodulate it into an electromagnetic touch signal, which is then processed by the processor into an electromagnetic touch corresponding signal and transmitted to the peripheral interface, thus achieving the whole process of conversion from the variable array dual-function touch sensor to the electromagnetic touch antenna array, electromagnetic touch signal switching, scanning detection and processing.

6. A dual-function touch display device with a dual-function touch module, comprising the dual-function touch module of claim 5, a display screen transparent panel and a display screen module.

7. A dual-function touch display device of claim 6, wherein the dualfunction touch module is arranged between the display screen transparent panel and the display screen module.

\* \* \* \* \*